(12) United States Patent
Alzner et al.

(10) Patent No.: US 9,233,317 B2
(45) Date of Patent: Jan. 12, 2016

(54) COLUMN

(71) Applicant: LINDE AKTIENGESELLSCHAFT, Munich (DE)

(72) Inventors: Gerhard Alzner, Munich (DE); Christian Matten, Pullach (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 515 days.

(21) Appl. No.: 13/650,590

(22) Filed: Oct. 12, 2012

(65) Prior Publication Data

US 2013/0092063 A1 Apr. 18, 2013

(30) Foreign Application Priority Data

Oct. 14, 2011 (DE) .......................... 10 2011 116 181

(51) Int. Cl.
| | | |
|---|---|---|
| *F23J 15/04* | (2006.01) | |
| *B01D 3/20* | (2006.01) | |
| *B01D 53/18* | (2006.01) | |
| *B01D 3/32* | (2006.01) | |

(52) U.S. Cl.
CPC ............ *B01D 3/20* (2013.01); *B01D 3/326* (2013.01); *B01D 3/328* (2013.01); *B01D 53/18* (2013.01)

(58) Field of Classification Search
CPC .......... B01D 3/20; B01D 3/326; B01D 3/328; B01D 53/18
See application file for complete search history.

(56) References Cited

U.S. PATENT DOCUMENTS

| | | | | | |
|---|---|---|---|---|---|
| 4,698,138 | A | * | 10/1987 | Silvey | 203/91 |
| 4,744,929 | A | * | 5/1988 | Robinson et al. | 261/97 |
| 5,338,517 | A | * | 8/1994 | Evans et al. | 422/605 |
| 6,123,323 | A | * | 9/2000 | Yoneda et al. | 261/96 |
| 7,118,654 | B2 | * | 10/2006 | Hammon et al. | 203/57 |
| 2004/0206617 | A1 | * | 10/2004 | Diehl et al. | 203/8 |
| 2009/0049864 | A1 | * | 2/2009 | Kovak et al. | 62/643 |

* cited by examiner

*Primary Examiner* — Amber Orlando
*Assistant Examiner* — Britanny Precht
(74) *Attorney, Agent, or Firm* — Millen, White, Zelano, Branigan, P.C.

(57) ABSTRACT

The invention relates to a column, with a jacket, extending along a longitudinal axis, which jacket bounds a first jacket space and a second jacket space arranged over it along the longitudinal axis, a chimney tray, extending crosswise to the longitudinal axis, that separates the two jacket spaces from one another. The at least a first chimney extends from the tray along the longitudinal axis, and projects into the second jacket space. The chimney has a peripheral wall defining an opening, via which the two jacket spaces are connected to one another for gas feed, and a chimney top. On the peripheral wall, a flat impact element is arranged tilted toward the longitudinal axis in such a way that a liquid phase flowing downward from the chimney top along the longitudinal axis strikes the flat impact element diminishing the momentum input of the liquid phase that stands on the chimney tray.

20 Claims, 8 Drawing Sheets

COLUMN

SUMMARY OF THE INVENTION

The invention relates to a column having a jacket that is extended along a longitudinal axis. The jacket bounds a first jacket space and a second jacket space arranged over it along the longitudinal axis. A chimney tray separates the two jacket spaces from one another and is extended crosswise to the longitudinal axis, from which tray at least a first chimney, extending in the direction of the longitudinal axis, projects into the second jacket space. The first chimney has a peripheral wall, extending in the direction of the longitudinal axis, which defines an opening, via which the two jacket spaces are connected to one another for gas feed, and which is covered by a chimney top, in such a way that a liquid phase that flows downward in the direction of the longitudinal axis into the second jacket space is prevented from flowing through the opening into the first jacket space.

Such a column is used in particular in the direct material exchange of two media, e.g., in the form of a (flowing) gaseous phase directed upward in the column and a (flowing) liquid phase (e.g., washing agent) directed downward in the column, and has a (pressurized) jacket that is extended in the direction of a longitudinal axis of the column, which jacket bounds a first jacket space and a second jacket space arranged over it along the longitudinal axis, whereby the longitudinal axis—relative to a state of the column that is arranged as directed—preferably runs parallel to the vertical, and whereby the two jacket spaces are separated from one another by a chimney tray that is extended perpendicular to the longitudinal axis, from which tray at least a first chimney, extending in the direction of the longitudinal axis, projects into the second jacket space, and whereby the first chimney has a peripheral wall, extending in the direction of the longitudinal axis, which bounds an opening, via which the two jacket spaces are connected to one another for gas feed, and which is covered by a chimney top (for collecting the liquid phase), so that a liquid phase that flows downward, in particular from the chimney top, along the longitudinal axis into the second jacket space is prevented from flowing through the opening (directly) into the first jacket space.

In such (washing) columns (absorbers), which optionally also have more than two gas-permeable sections (jacket spaces), the liquid phase is collected on the respective chimney tray and drawn off. In columns with comparatively large liquid cycles, in this case correspondingly tall chimneys that project from the chimney trays are necessary (e.g., at a height along the longitudinal axis in the range of 7 m to 10 m). The liquid phase is partially collected on the chimney tops covering the chimneys and drops down in some cases 5 m to 10 m to the respective chimney tray (bottom), depending on the state of the liquid phase on the chimney tray in question. Here, in the case of high dropping heights and massive jets, a great deal of gas is introduced into the liquid phase on the chimney tray.

The input of gas by the dropping liquid can lead to massive and relatively tall foam layers in media that tend to foam (e.g., washing agents of the MDEA type). These foam layers are particularly critical when foam goes over the opening of the chimney (chimney neck) into the subjacent column sections (jacket spaces) (so-called "carry under").

The basis of this invention therefore starts from the problem of providing a column of the above-mentioned type in which the risk that a liquid medium of a liquid cycle goes from a column section (second jacket space) into the subjacent column section (first jacket space) (so-called "carry under") is reduced.

Upon further study of the specification and appended claims, other aspects and advantages of the invention will become apparent.

In accordance with the invention, the above-mentioned problem is addressed by a column wherein, on the wall, there is arranged a flat impact element, tilted with respect to the longitudinal axis, in such a way that a liquid phase that flows downward from the chimney top along the longitudinal axis strikes the flat impact element to diminish, in particular, the momentum input in a liquid phase that stands on the chimney tray.

Thus, it is provided that on the wall of at least a first chimney, a flat impact element is arranged tilted toward the wall (or tilted toward the chimney tray) in such a way that a jet of the liquid phase that drops from the chimney top along the longitudinal axis strikes the flat impact element thereby diminishing the momentum of the falling jet.

The flat impact element preferably has a large number of through-openings. In this case, the flat impact element is preferably designed in such a way that at least a portion of the downward flowing liquid phase goes through the through-openings. The thus produced smaller jets have a lower momentum. In addition, the flat impact element is preferably designed in such a way that at least a portion of the outflowing liquid phase is deflected by the flat impact element, in particular in the direction toward an inner side of the jacket that faces the second jacket space, from which the liquid phase then trickles out to the chimney tray (bottom). Also, in this way, the momentum input in the bottom liquid is reduced.

Of course, the possibility also exists that the flat impact element will not have any through-openings at all and will break the momentum input of the dropping jet by deflecting all liquid that strikes the flat impact element, e.g., in the direction toward the inner side of the jacket that faces the chimney tray.

Preferably, the flat impact element extends from the wall of the first chimney, namely obliquely downward with respect to the longitudinal axis, in such a way that a bottom side of the flat impact element that faces downward encompasses an acute angle, in particular in the range of 45°, with a (flat) outer side of the wall of the first chimney facing the bottom side, and the chimney runs in particular along an extension plane extended parallel to the longitudinal axis. From the outer side, in particular another outer side extends perpendicular to the two sides, whereby the other outer sides point away from one another or run parallel to one another.

Preferably, the flat impact element has a first edge area and an opposite second edge area, whereby the first edge area is fixed via a first carrier and the second edge area is fixed via a second carrier on the wall of the first chimney, namely in such a case on one of the other outer sides of the wall, whereby the two carriers in each case preferably have an angular profile. The first and the second carriers in each case can have a (middle) first section in the form of an angle profile, which runs along on the first or second edge area of the flat impact element and is fixed thereto, whereby the middle first sections each have a first free end area and an opposite second free end area. In this connection, in each case a second section of the respective carrier extends from the first end area and a third section of the respective carrier extends from the second free end area, whereby the second and third sections run along the horizontal and in each case are preferably connected to the other outer sides of the wall of the chimney (e.g., by welded joints).

Preferably, the flat impact element is formed by an expanded metal grating, which forms a large number of through-openings.

It is preferably provided that the through-openings of the impact element or the expanded metal grating have in each case—relative to the longitudinal axis—an upper edge area and an associated lower edge area, which in particular form overall a peripheral, especially rhombic edge area of the respective through-opening.

The two edge areas of a through-opening in each case preferably run in a cross-section extended lengthwise along the horizontal, whereby optionally also an acute angle with the horizontal can be encompassed, in such a way that the through-openings in particular in each case form a channel (optionally with a slight tilting relative to the horizontal) that is essentially extended along the horizontal, whereby in particular the cross-sectional plane, to which the cross-section relates, is formed by a direction that runs parallel to the longitudinal axis and a direction that runs parallel to the two edge areas of the impact element, i.e., the cross-sectional plane preferably runs parallel to the longitudinal axis and is in this case perpendicular to the outer side of the wall of the chimney that faces the impact element.

Preferably, the two edge areas are formed by forming a section, in particular by punching, in the production of the expanded metal grating from a flat metal plate (plate), whereby the expanded metal grating is produced by expanding the punched metal plate perpendicular to the extension direction of the section, in such a way that the two edge areas (up to their connecting points) are removed from one another and together in each case define a through-opening of the expanded metal grating.

BRIEF DESCRIPTION OF THE DRAWINGS

Further advantages, features and examples of the present invention shall be described in the following with reference to the Figures, wherein

In connection with FIGS. 2 to 7, FIG. 1 shows a column 1 that is used in, e.g., the direct material exchange between a gaseous phase and a liquid phase F, for example in the form of a washing agent.

Figure 1:
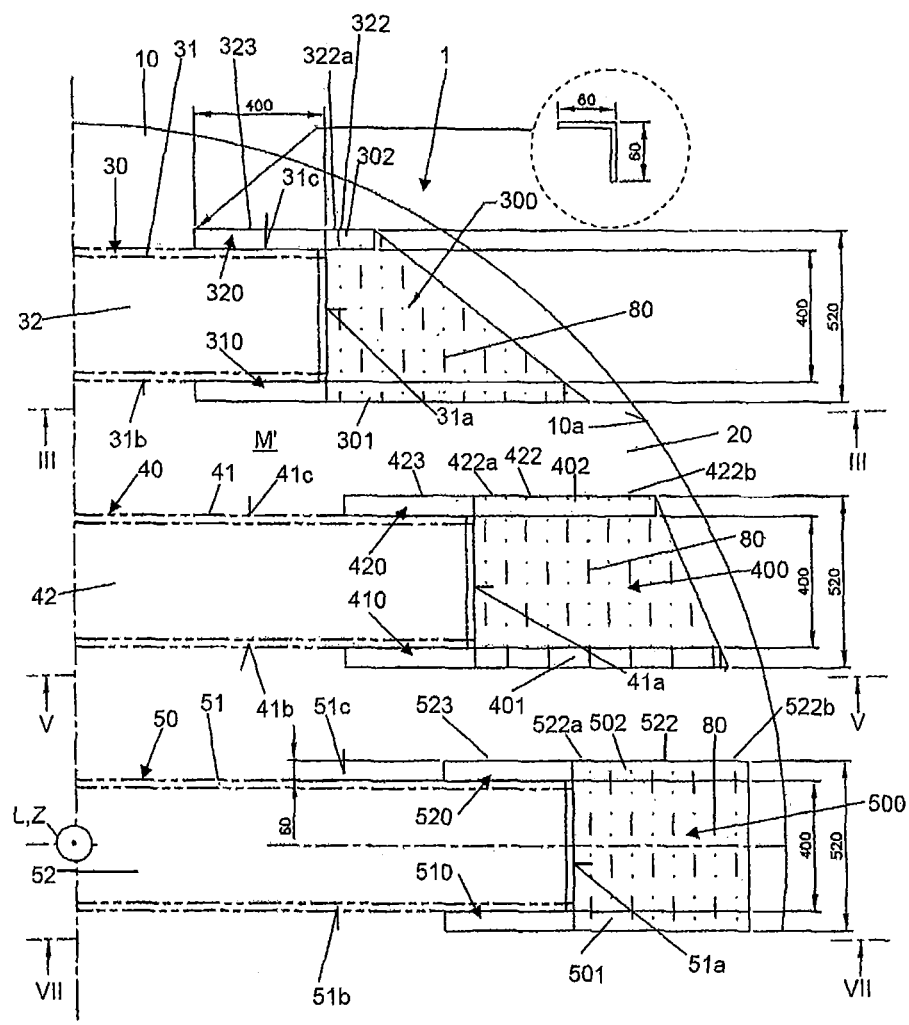
FIGS. 1-2 show fragmentary top views of a chimney tray of a column according to the invention.

The column 1 has a cylindrical jacket 10, which extends along a longitudinal axis L, which coincides with the cylindrical axis of the jacket 10. Relative to a state of the jacket 10 that is arranged as directed, the longitudinal axis L that is present is extended parallel to the vertical Z.

The jacket 10 bounds at least a first jacket space M and a second jacket space M' that is arranged there above. In this case, the two jacket spaces M, M' are separated from one another by a chimney tray 20, which extends crosswise to the longitudinal axis L via the column cross-section. A first, a second, a third, a fourth, and a fifth chimney 30, 40, 50, 60, 70 in the second jacket space M' project from the chimney tray 20 in the direction of the longitudinal axis L, which in each case have a peripheral wall 31, 41, 51, 61, 71, which in each case has a rectangular contour in a cross-sectional plane that runs perpendicular to the longitudinal axis L. Here, the chimneys 30, 40, 50, 60, 70 in each case have a narrow front side or outer side 31a, 41a, 51a, 61a, 71a, which in each case is facing an inner side 10a of the jacket 10 that faces the second jacket space M'. In each case, on both sides, two other outer sides 31b, 31c, 41b, 41c, 51b, 51c, 61b, 61c, 71b, 71c extend from each front side 31a, 41a, 51a, 61a, 71a per chimney 30, 40, 50, 60, 70, and the outer sides are extended parallel to one another. In addition, each chimney 30, 40, 50, 60, 70 has another front side, which faces away from a front side 31a, 41a, 51a, 61a, 71a. Also, on these other front sides, the flat impact elements described below can be arranged (analogously). For the sake of simplicity, however, only one front side 31a, 41a, 51a, 61a, 71a and flat impact elements arranged thereon are described below.

On one upper free end of the chimneys 30, 40, 50, 60, 70, the walls 31, 41, 51, 61, 71 of the chimneys 30, 40, 50, 60, 70 in each case define an opening 32, 42, 52, 62, 72 of the respective chimney 30, 40, 50, 60, 70, which walls in each case are covered by a chimney top 33, 43, 53, 63, 73 that is assigned to the respective chimney 30, 40, 50, 60, 70 or is fixed on the chimney in question 30, 40, 50, 60, 70, in such a way that a gaseous phase from the first jacket space M can pass namely along the longitudinal axis L over the respective chimney 30, 40, 50, 60, 70 or its opening 32, 42, 52, 62, 72 into the second jacket space M', whereby, however, a liquid phase F in the second jacket space M', which is directed in counter-current to the gaseous phase, cannot flow into the respective opening 32, 42, 52, 62, 72 but rather is collected on the chimney top 33, 43, 53, 63, 73 that is assigned in each case corresponding to the surface of the chimney top 33, 43, 53, 63, 73.

Now, to prevent excessive momentum from being introduced into a liquid F that stands on the chimney tray 20 by the liquid phase F dropping into the second jacket space M', which could result in, for example, excessive foam production with the danger that the foam can go over the chimneys 30, 40, 50, 60, 70 into the subjacent first jacket space M ("carry under"), in each case a flat impact element 300, 400, 500, 600, 700 (extended along an extension plane), which has a large number of through-openings 80, is provided on the front side on the chimneys 30, 40, 50, 60, 70. The impact elements 300, 400, 500, 600, 700 in this case extend to half the height (relative to the longitudinal axis L) of the respective chimney 30, 40, 50, 60, 70 from the chimney 30, 40, 50, 60, 70, and in this case run obliquely downward with respect to the longitudinal axis L in such a way that the respective front or outer side 31a, 41a, 51a, 61a, 71a of the wall 31, 41, 51, 61, 71 of the respective chimney 30, 40, 50, 60, 70 encompasses an angle W of preferably 45° with a bottom side 300a, 400a, 500a, 600a, 700a of the respective impact element 300, 400, 500, 600, 700 that faces the respective outer side 31a, 41a, 51a, 61a, 71a.

Figure 8:
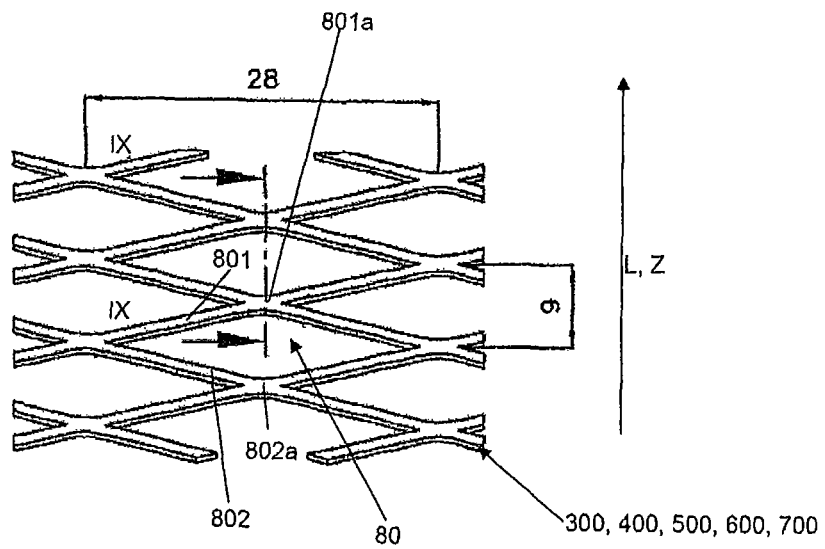
FIG. 8 shows a fragmentary perspective view of an impact element according to the invention.
Figure 9:
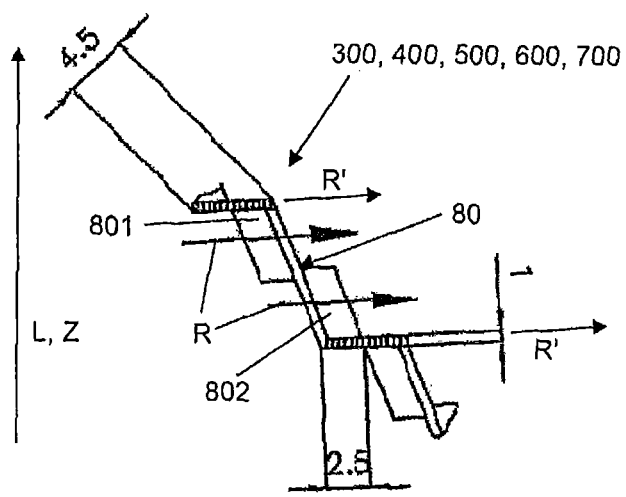
FIG. 9 shows a partially cut view of the impact element according to FIG. 8 along Line IX-IX of FIG. 8.

The flat impact elements 300, 400, 500, 600, 700 are preferably designed as expanded metal grating according to FIGS. 8 and 9, whereby the orientation of the expanded metals or impact elements 300, 400, 500, 600, 700 is configured in such a way that the direction of flow R of the expanded metal grating 300, 400, 500, 600, 700 is oriented toward the inner side 10a of the jacket 10. In this connection, the intention is to allow a portion of the liquid jet F to flow through the open surface (through-openings) 80 of the respective expanded metal grating 300, 400, 500, 600, 700. The smaller jets that are thus produced have a lower momentum, whereby the portion that does not flow through the open surface or through the through-openings 80 is deflected toward the inner side 10a of the jacket 10 and trickles under there. Also, in this way, the momentum input in the bottom liquid F is reduced.

The through-openings 80 of the flat impact elements 300, 400, 500, 600, 700 are produced by punching and extending a metal plate crosswise to the directions of extension of the punched sections. In this way, each through-opening 80 has an upper edge area 801 (curved in the middle 801a) and an associated lower edge area 802 (curved in the middle 802a), in such a way that in particular (approximately) rhombic through-openings 80 are produced, whose diameter is 28 mm along a horizontally running (long) major axis in one embodiment and 9 mm along a secondary axis that is perpendicular thereto or vertically running (short). Because of the extension of the metal plates underlying the respective expanded metal grating 300, 400, 500, 600, 700, the two edge areas 801, 802 of the respective through-opening 80 in the cross-section according to FIG. 9 (relative to a cross-sectional plane running parallel to the longitudinal axis and perpendicular to the respective outer side 31a, 41a, 51a, 61a, 71a) have a (rectangular) cross-section that is longitudinally extended along a longitudinal extension direction R', whereby the longitudinal extension direction R' essentially extends along the horizontal. This produces a direction of flow R of the respective flat impact element or expanded metal grating 300, 400, 500, 600, 700, which runs parallel to the longitudinal extension direction R' of the respective cross-sectional contour of the edge area 801, 802 in question.

Figure 2:
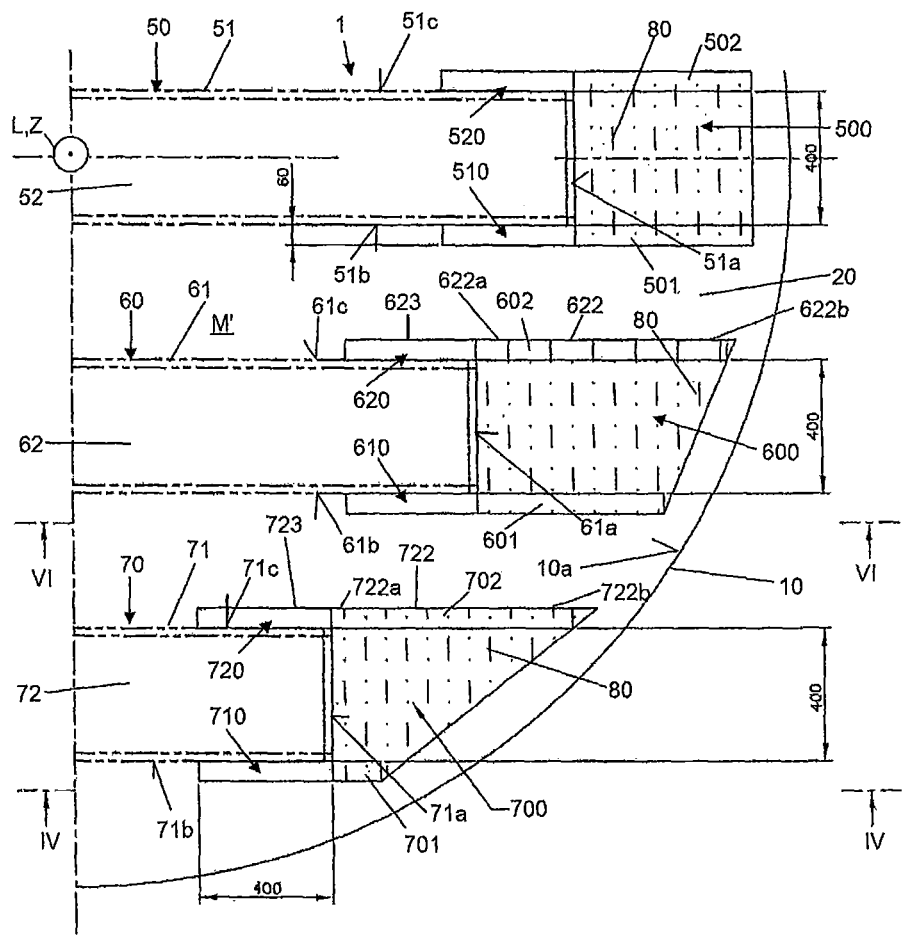

According to FIGS. 1 and 2, the chimneys 30, 40, 50, 60, 70 are parallel to one another (arranged beside one another) along a diameter of the chimney tray 20, whereby the first chimney 30 and the fifth chimney 70 are arranged outside (adjacent to the inner side 10a of the jacket 10), and whereby the third chimney 50 is arranged in the center of the chimney tray 20. The second and the fourth chimneys 40, 60 are in each case arranged along the diameter between the first and third or the third and fifth chimneys 30, 50 or 50, 70. The front sides or outer sides 31a, 41a, 51a, 61a, 71a of chimneys 30, 40, 50, 60, 70 therefore point in the same direction and extend parallel to the diameter.

The individual flat impact elements 300, 400, 500, 600, 700 in each case have a first edge area 301, 401, 501, 601, 701 and a second edge area 302, 402, 502, 602, 702 that runs parallel thereto, which in each case are fixed via an assigned first carrier 310, 410, 510, 610, 710 or second carrier 320, 420, 520, 620, 720 on the wall 31, 41, 51, 61, 71 of the respectively assigned chimney 30, 40, 50, 60, 70. In this connection, the two carriers 310, 410, 510, 610, 710 or 320, 420, 520, 620, 720 are each fixed on one of the other outer sides 31b, 41b, 51b, 61b, 71b or 31c, 41c, 51c, 61c, 71c of the respective chimney 30, 40, 50, 60, 70, namely preferably via welded joints V.

The first and second carriers 310, 410, 510, 610, 710 and 320, 420, 520, 620, 720 of each flat impact element 300, 400, 500, 600, 700 in each case have a (middle) first section 312, 412, 512, 612, 712 or 322, 422, 522, 622, 722 in the form of an angle profile (cf. Detail of FIG. 1), which in each case is fixed on the first edge area 301, 401, 501, 601, 701 or the second edge area 302, 402, 502, 602, 702 of an assigned impact element 300, 400, 500, 600, 700 (e.g., by welded joints).

Figure 5:
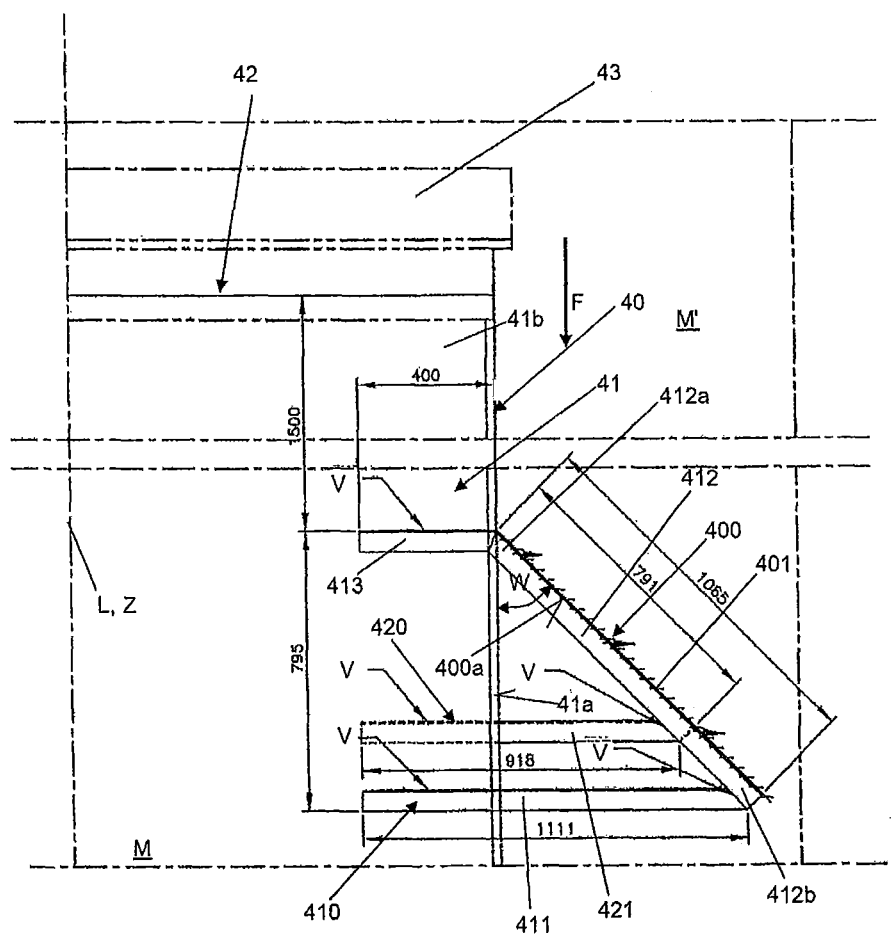
FIG. 5 shows a view of a second chimney of the chimney tray along Plane V-V of FIG. 1.
Figure 6:
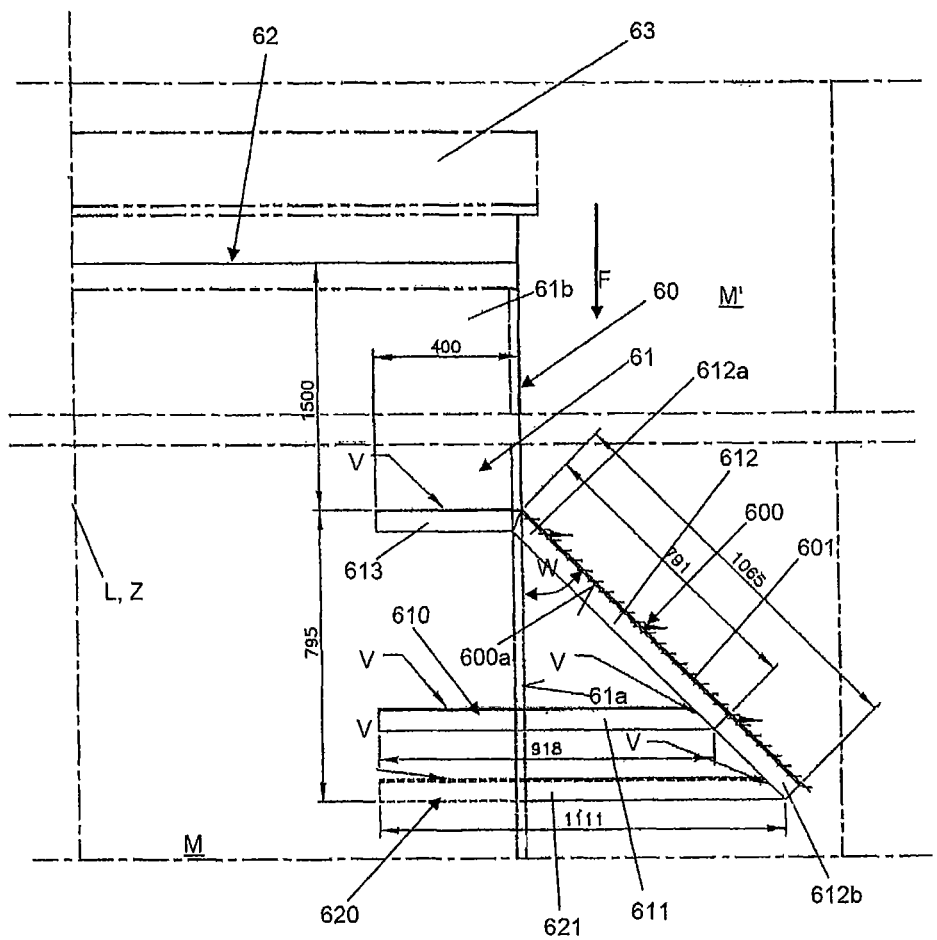
FIG. 6 shows a view of a fourth chimney of the chimney tray along Plane VI-VI of FIG. 2.
Figure 7:
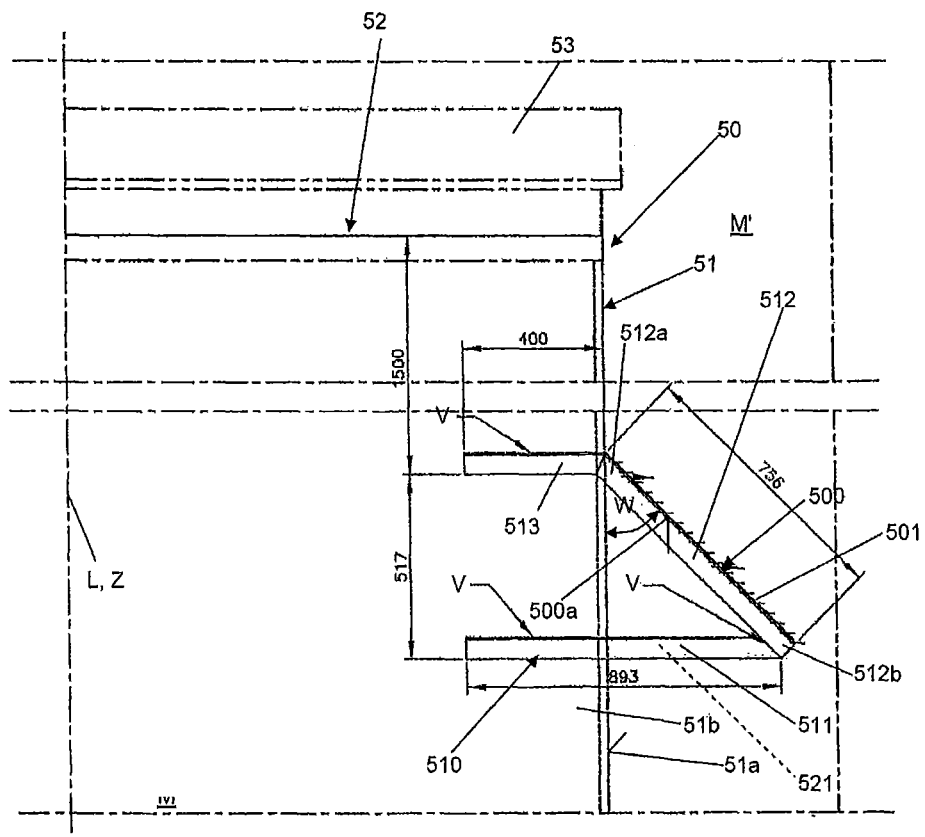
FIG. 7 shows a view of a third chimney of the chimney tray along Plane VII-VII of FIG. 1.

As far as the second to fourth chimneys 40, 50, 60 are concerned (cf. FIGS. 5, 7 and 6), the middle first sections 412, 512, 612 or 422, 522, 622 of the respective carriers 410, 510, 610 or 420, 520, 620 each have a first free end area 412a, 512a, 612a and an opposite second free end area 412b, 512b, 612b as well as 422a, 522a, 622a or 422b, 522b, 622b, of which the second free end area 412b, 512b, 612b or 422b, 522b, 622b is at some distance from the respective chimney 40, 50, 60, and the first free end area 412a, 512a, 612a or 422a, 522a, 622a is arranged adjacent to the respective chimney 30, 40, 50, 60, 70.

In this case, a second section 413, 513, 613 or 423, 523, 623 of the respective carrier 410, 510, 610 or 420, 520, 620 extends in each case from the first end area 412a, 512a, 612a or 422a, 522a, 622a, and a third section 411, 511, 611 or 421, 521, 621 of the respective carrier 410, 510, 610 or 420, 520, 620 extends from the second free end area 412b, 512b, 612b or 422b, 522b, 622b, whereby the second and third sections 413, 513, 613 or 423, 523, 623 as well as 411, 511, 611 or 421, 521, 621 run along the horizontal and in each case are preferably connected via a free end to the other outer sides 41b, 51b, 61b or 41c, 51c, 61c of the wall 41, 51, 61 of the respective chimney 40, 50, 60, namely preferably by welded joints V. The sections 412, 512, 612 or 422, 522, 622 as well as 413, 513, 613 or 423, 523, 623 as well as 411, 511, 611 or 421, 521, 621 of the carriers 410, 510, 610 or 420, 520, 620 can optionally be connected to one another via welded joints V or can be integrally molded onto one another.

Figure 4:
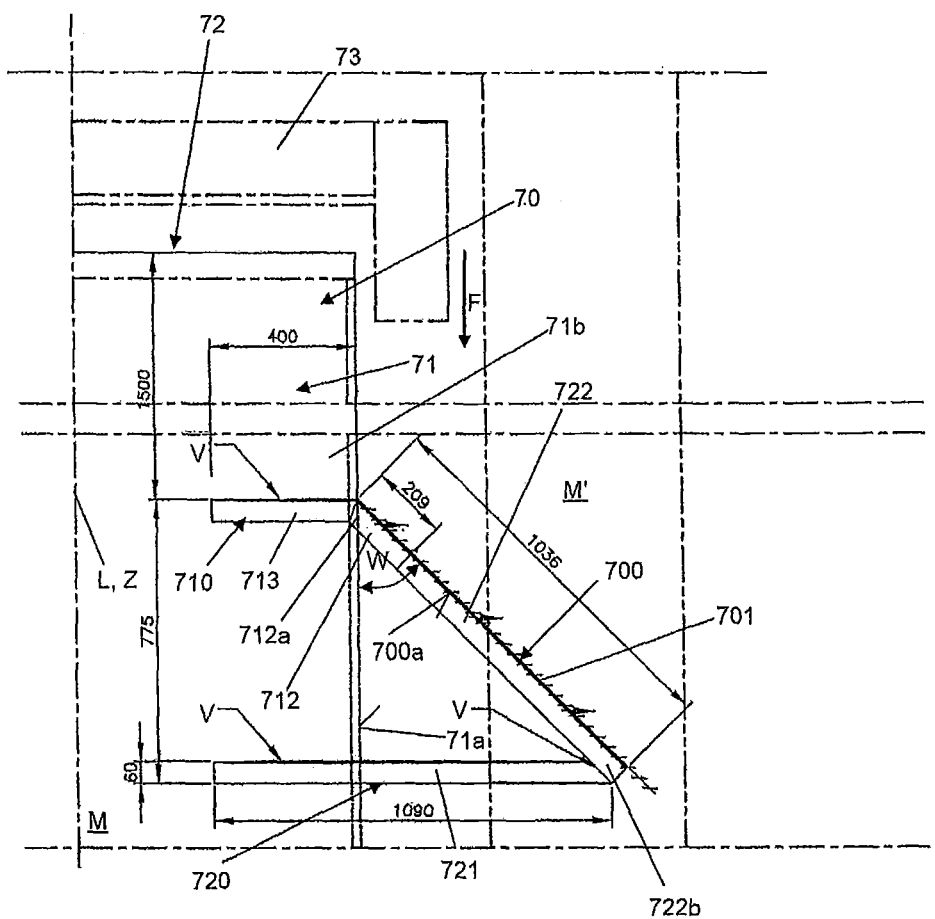
FIG. 4 shows a view of a fifth chimney of the chimney tray along Plane IV-IV of FIG. 2.

As far as the first and the fifth chimneys 30, 70 are concerned, the assigned flat impact elements 300, 700 in each case have a comparatively short second or first edge area 302, 701 (in each case on a side that is adjacent to the inner side 10a of the jacket 10 or a side that faces the latter). The corresponding first sections 322, 712 of the second or first carrier 320, 710 (cf. FIG. 1 or FIG. 4) therefore have only one second section 323 or 713 that extends from the first free end area 322a, 712a of the respective first section 322, 712, and the second section in each case is fixed via a free end on the assigned other outer side 31b, 31c, 71b, 71c of the first or fifth chimney 30, 70.

Figure 3:
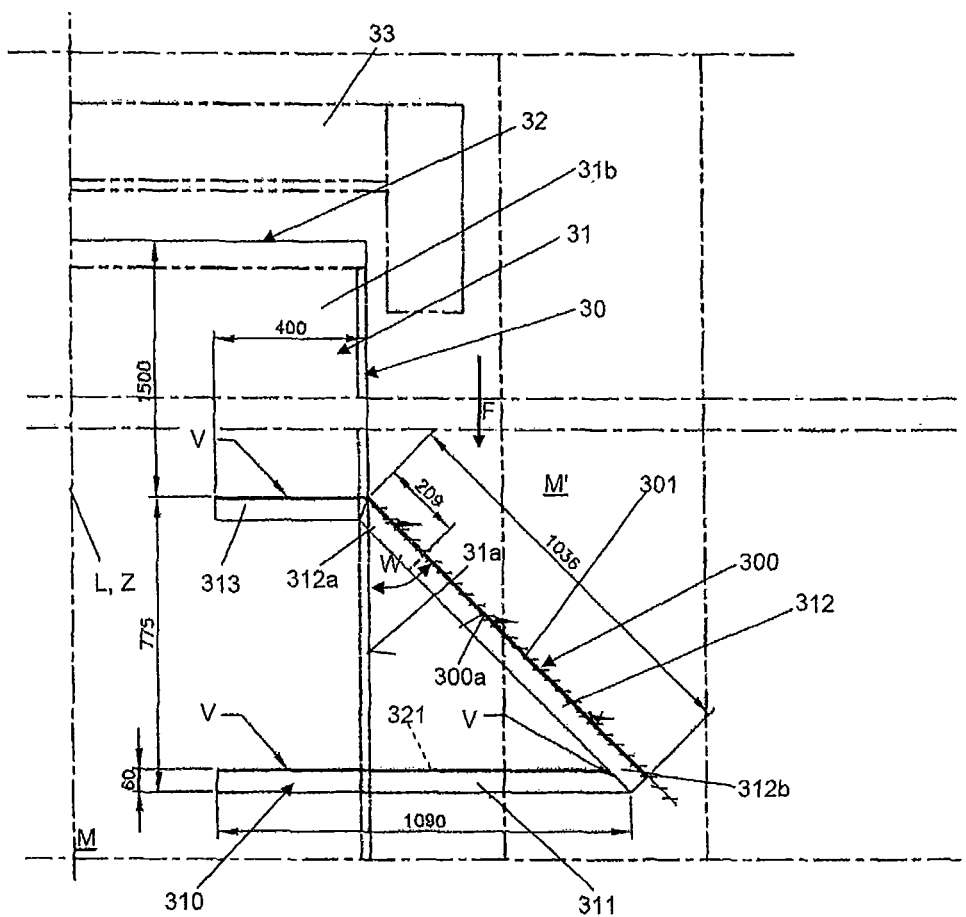
FIG. 3 shows a view of a first chimney of the chimney tray along Plane III-III of FIG. 1.

The sections 312, 313, 311 of the first carrier 310 of the impact element 300 of the first chimney 30 (cf. FIG. 3) as well as the sections 722, 723, 721 of the second carrier 720 of the impact element 700 of the fifth chimney 70 (cf. FIGS. 2 and 4) are designed as described above, based on the second to fourth chimneys 40, 50, 60.

Another advantage of the flat impact elements 300, 400, 500, 600, 700 consists in that protective elements, e.g., in the form of protective sheets for protecting or covering supports for measuring points, can be fixed on the impact elements 300, 400, 500, 600, 700.

At present, any number of chimneys and assigned flat impact elements of the above-described type can be provided. In FIGS. 1 to 9, dimensions are indicated in mm, which are to be understood as examples. Other dimensions as well as setting angle W of the flat impact elements 300, 400, 500, 600, 700 are also conceivable.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding German patent application No. DE 10 2011 116 181.7, filed Oct. 14, 2011, are incorporated by reference herein.

| Reference Symbol List | |
|---|---|
| 1 | Column |
| 10 | Jacket |
| 10a | Inner Side |
| 20 | Chimney Tray |
| 30, 40, 50, 60, 70 | Chimney |
| 31, 41, 51, 61, 71 | Wall |
| 31a, 41a, 51a, 61a, 71a | Front or Outer Side |
| 31b, 41b, 51b, 61b, 71b | Other Outer Side |
| 31c, 41c, 51c, 61c, 71c | Other Outer Side |
| 32, 42, 52, 62, 72 | Opening |
| 33, 43, 53, 63, 73 | Chimney Top |
| 80 | Through-Opening |
| 300, 400, 500, 600, 700 | Flat Impact Element |
| 300a, 400a, 500a, 600a, 700a | Bottom Side |
| 301, 401, 501, 601, 701 | First Edge Area |
| 302, 402, 502, 602, 702 | Second Edge Area |
| 310, 410, 510, 610, 710 | First Carrier |
| 320, 420, 520, 620, 720 | Second Carrier |
| 312, 412, 512, 612, 712 | First (Middle) Section (First Carrier) |
| 322, 422, 522, 622, 722 | First (Middle) Section (First Carrier) |
| 313, 413, 513, 613, 713 | Second Section (First Carrier) |
| 323, 423, 523, 623, 723 | Second Section (Second Carrier) |
| 311, 411, 511, 611, 711 | Third Section (First Carrier) |
| 321, 421, 521, 621, 721 | Third Section (Second Carrier) |
| 801 | Upper Edge Area |
| 802 | Lower Edge Area |
| 801a, 802a | Middle |
| F | Liquid Phase |
| L | Longitudinal Axis |
| M | First Jacket Space |
| M' | Second Jacket Space |
| R | Direction of Flow |
| R' | Longitudinal Extension Direction |
| Z | Vertical |

The invention claimed is:

1. A column comprising:
a jacket (10) that extends along a longitudinal axis (L), said jacket bounding a first jacket space (M) and a second jacket space (M'), arranged over said first jacket space (M), along said longitudinal axis (L),
a chimney tray (20) that separates the first and second jacket spaces (M, M') from one another and extends in a direction crosswise to said longitudinal axis (L),
at least a first chimney (30) extends from said chimney tray (20) along said longitudinal axis (L) and projects into said second jacket space (M'), whereby said at least a first chimney (30) has a peripheral wall (31) extending along said longitudinal axis (L), which defines an opening (32), via which said first and second jacket spaces (M, M') are connected to one another for gas feed, wherein said opening (32) is covered by a chimney top (33), in such a way that a liquid phase (F) that flows downward along said longitudinal axis (L) into said second jacket space (M') is prevented from flowing through said opening (32) into said first jacket space (M),
a flat impact element (300) is positioned on said peripheral wall (31) and is arranged tilted toward said longitudinal axis (L) in such a way that a liquid phase (F) that flows downward from said chimney top (33) along said longitudinal axis (L) strikes said flat impact element (300) to diminish momentum input of liquid phase (F) that stands on said chimney tray (20).

2. The column according to claim 1, wherein said flat impact element (300) has a large number of through-openings (80).

3. The column according to claim 1, wherein said flat impact element (300) forms an acute angle (W) with said longitudinal axis (L).

4. The column according to claim 2, wherein said flat impact element (300) forms an acute angle (W) with said longitudinal axis (L).

5. The column according to claim 2, wherein the flat impact element (300) is configured in such a way that at least a portion of downward-flowing liquid phase (F) can flow through said through-openings (80).

6. The column according to claim 4, wherein the flat impact element (300) is configured in such a way that at least a portion of downward-flowing liquid phase (F) can flow through said through-openings (80).

7. The column according to claim 1, wherein said flat impact element (300) is configured in such a way that at least a portion of downward-flowing liquid phase (F) can be deflected by said flat impact element (300).

8. The column according to claim 1, wherein said flat impact element (300) extends from said peripheral wall (31) of said first chimney (30), whereby said flat impact element (300) runs tilted toward said peripheral wall (31) of said first chimney (30), and whereby a bottom side (300a) of said flat impact element (300), that faces downward along the longitudinal axis (L), forms an acute angle (W) with an outer side (31a) of said peripheral wall (31) facing said bottom side (300a).

9. The column according to claim 1, wherein said flat impact element (300) has a first edge area (301) and a second opposite edge area (302), whereby said first edge area (301) is fixed via a first carrier (310) and said second edge area (302) is fixed via a second carrier (320) to said peripheral wall (31) of said first chimney (30).

10. The column according to claim 1, wherein said flat impact element (300) is formed by an expanded metal grating, which forms a large number of through-openings (80).

11. The column according to claim 2, wherein the through-openings (80) in each case—relative to said longitudinal axis (L)—has an upper edge area (801) and an associated lower edge area (802).

12. The column according to claim 11, wherein the upper edge area and associated lower edge area (801, 802) of each of said through-openings (80) run along the horizontal, extended lengthwise in cross-section, in such a way that each of said through-openings (80) form a channel that is essentially extended along the horizontal.

13. The column according to claim 11, wherein said flat impact element (300) is formed by an expanded metal grating, which forms said through-openings (80), and wherein the upper edge area and associated lower edge area of each through-opening (801, 802) are formed by forming a section in the production of said expanded metal grating (300) from a flat metal plate.

14. The column according to claim 3, wherein said acute angle (W) is about 45°.

15. The column according to claim 4, wherein said acute angle (W) is about 45°.

16. The column according to claim 1, wherein said flat impact element (300) is configured in such a way that at least a portion of downward-flowing liquid phase (F) can be deflected by said flat impact element (300) in the direction towards the inner side (10a) of said jacket (10) that faces said second jacket space (M').

17. The column according to claim 1, wherein said flat impact element (300) extends from said peripheral wall (31) of said first chimney (30), whereby said flat impact element (300) runs tilted toward said peripheral wall (31) of said first chimney (30), and whereby a bottom side (300a) of said flat impact element (300), that faces downward along the longitudinal axis (L), forms an acute angle (W) of about 45° with an outer side (31a) of said peripheral wall (31) facing said bottom side (300a).

18. The column according to claim 1, wherein said flat impact element (300) extends from said peripheral wall (31) of said first chimney (30), whereby said flat impact element (300) runs tilted toward said peripheral wall (31) of said first chimney (30), and whereby a bottom side (300a) of said flat impact element (300), that faces downward along the longitudinal axis (L), forms an acute angle (W) of about 45° with an outer side (31a) of said peripheral wall (31) facing said bottom side (300a), whereby said outer side (31a, 41a, 51a, 61a, 71a) runs parallel to an extension plane that is extended parallel to said longitudinal axis (L).

19. The column according to claim 1, wherein said flat impact element (300) has a first edge area (301) and a second opposite edge area (302), whereby said first edge area (301) is fixed via a first carrier (310) and said second edge area (302) is fixed via a second carrier (320) to said peripheral wall (31) of said first chimney (30) wherein said first and said carriers (310, 320) have an angular profile.

20. The column according to claim 11, wherein said flat impact element (300) is formed by an expanded metal grating, which forms said through-openings (80), and wherein the upper edge area and associated lower edge area of each through-opening (801, 802) are formed by punching during the production of said expanded metal grating (300) from a flat metal plate.

* * * * *